US012779894B2

(12) United States Patent
Mazzolini et al.

(10) Patent No.: US 12,779,894 B2
(45) Date of Patent: Nov. 3, 2026

(54) SECURE DOCUMENT AND METHOD FOR MANUFACTURING A SECURE DOCUMENT

(71) Applicant: IDEMIA FRANCE, Courbevoie (FR)

(72) Inventors: Marie Mazzolini, Courbevoie (FR); Coralie Vandroux, Courbevoie (FR); Benoît Berthe, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 0 days.

(21) Appl. No.: 18/624,218

(22) Filed: Apr. 2, 2024

(65) Prior Publication Data

US 2024/0336082 A1 Oct. 10, 2024

(30) Foreign Application Priority Data

Apr. 4, 2023 (FR) ...................................... 23 03352

(51) Int. Cl.

| | |
|---|---|
| ***B42D 25/346*** | (2014.01) |
| ***B42D 25/373*** | (2014.01) |
| ***B42D 25/435*** | (2014.01) |
| ***B42D 25/45*** | (2014.01) |
| ***G02B 3/00*** | (2006.01) |
| *B42D 25/23* | (2014.01) |

(52) U.S. Cl.

CPC ......... *B42D 25/346* (2014.10); *B42D 25/373* (2014.10); *B42D 25/435* (2014.10);

(Continued)

(58) Field of Classification Search

CPC ............................ B42D 25/346; B42D 25/435

See application file for complete search history.

(56) References Cited

U.S. PATENT DOCUMENTS

2008/0182084 A1* 7/2008 Tompkin .............. B42D 25/328 428/195.1
2014/0175786 A1* 6/2014 Doublet ............... B42D 25/425 283/67

(Continued)

FOREIGN PATENT DOCUMENTS

DE 102010048772 A1 * 4/2012 ............ B41M 3/148
DE 10 2012 007 747 A1 10/2013

(Continued)

OTHER PUBLICATIONS

Aluminum Reflectivity vs Thickness https://www.researchgate.net/figure/Relationship-between-thickness-of-aluminum-and-reflectance-When-the-thickness-is-over_fig7_316976038 (Year: 2017).*

(Continued)

*Primary Examiner* — Kyle R Grabowski
(74) *Attorney, Agent, or Firm* — Oblon, McClelland, Maier & Neustadt, L.L.P.

(57) ABSTRACT

The present invention relates to a secure document and to a method for manufacturing a secure document. The secure document comprises:

a metal layer or metal oxide layer, a lenticular array comprising converging lenses positioned facing the metal layer or metal oxide layer, at least one transparent layer on which the metal layer or metal oxide layer is arranged such that said metal layer or metal oxide layer is interposed between the lenticular array and the transparent layer;

wherein the metal layer or metal oxide layer comprises perforations formed by focusing a plurality of laser radiations through the lenticular array onto the metal layer or metal oxide layer, the plurality of laser radiations being directed at a plurality n of angles of incidence in order to form said perforations so as to (Continued)

reveal n personalized images when the secure document is observed at the n angles of incidence, said perforations being produced in contiguous or overlapping perforation areas so as to form visual continuity between the n personalized images when said document is tilted.

9 Claims, 6 Drawing Sheets

(52) U.S. Cl.
CPC ............. *B42D 25/45* (2014.10); *G02B 3/005* (2013.01); *G02B 3/0056* (2013.01); *B42D 25/23* (2014.10)

(56) References Cited

U.S. PATENT DOCUMENTS

| | | | | |
|---|---|---|---|---|
| 2015/0183258 | A1* | 7/2015 | Raymond ............ | B42D 25/485 40/454 |
| 2016/0110638 | A1* | 4/2016 | Gregarek ............. | B42D 25/342 235/488 |
| 2019/0315150 | A1* | 10/2019 | Rauch .................. | B42D 25/435 |
| 2020/0009894 | A1 | 1/2020 | Prett et al. | |
| 2021/0309039 | A1 | 10/2021 | Janssen | |

FOREIGN PATENT DOCUMENTS

| | | | | |
|---|---|---|---|---|
| DE | 102014016009 | A1 * | 4/2016 | ........... B42D 25/435 |
| EP | 3 608 121 | A1 | 2/2020 | |
| FR | 3112099 | A1 * | 1/2022 | |
| WO | WO-2012010286 | A1 * | 1/2012 | ............ B42D 15/00 |
| WO | WO 2012/046213 | A1 | 4/2012 | |
| WO | WO-2013064268 | A1 * | 5/2013 | ............ B42D 25/29 |
| WO | WO 2020/010272 | A1 | 1/2020 | |
| WO | WO 2022/112708 | A1 | 6/2022 | |

OTHER PUBLICATIONS

Preliminary French Search Report issued Sep. 25, 2023 in French Application 23 03352 filed on Apr. 4, 2023, 8 pages (with Written Opinion).

* cited by examiner

[Fig. 1]
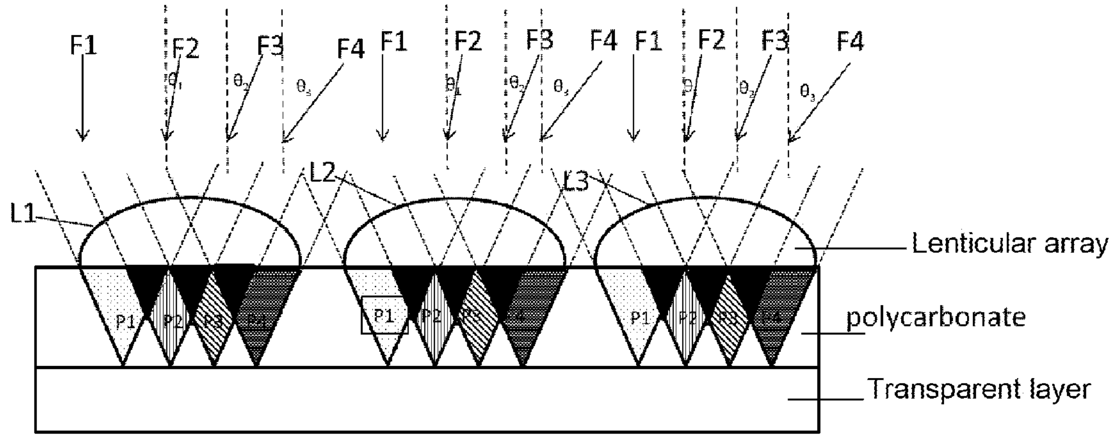
[Fig. 2]
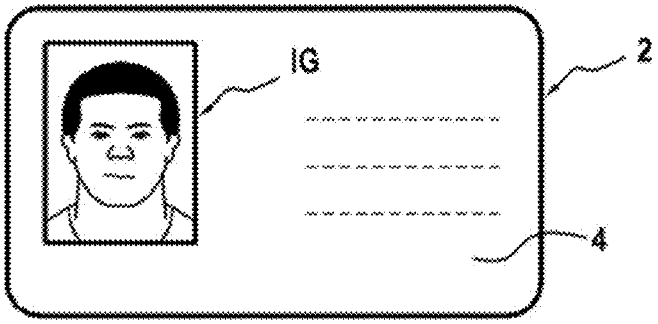

[Fig. 3a]
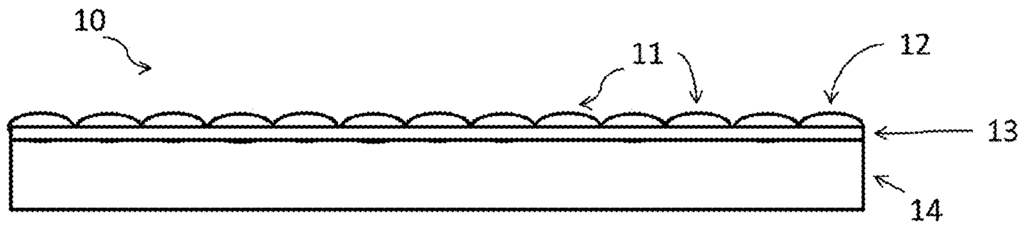
[Fig. 3b]
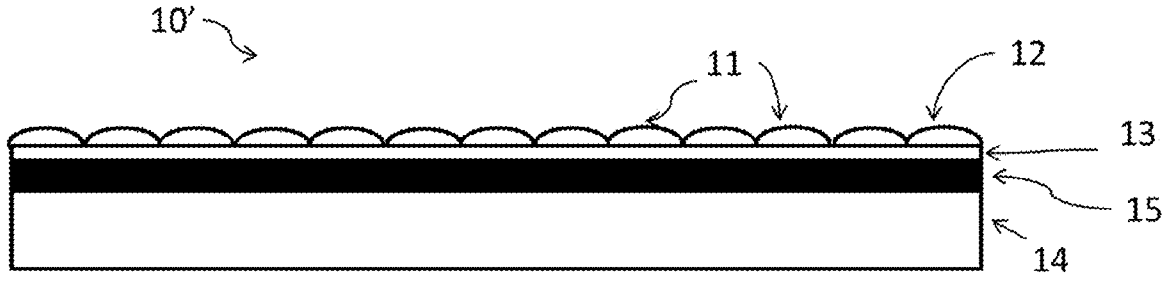
[Fig. 4a]
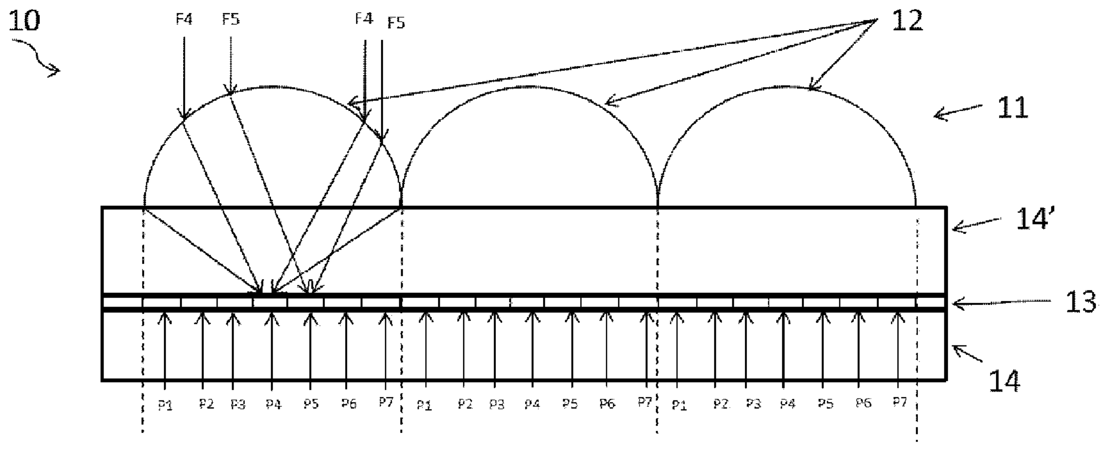
Sectional view

[Fig. 4b]
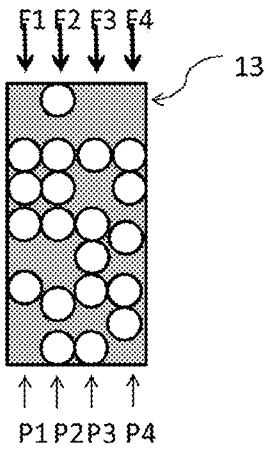
[Fig. 5b]
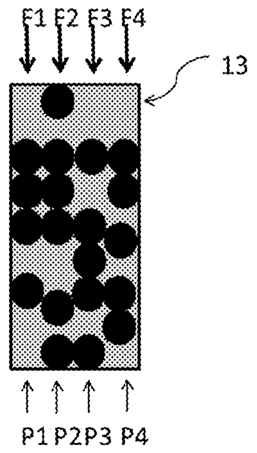
[Fig. 5a]
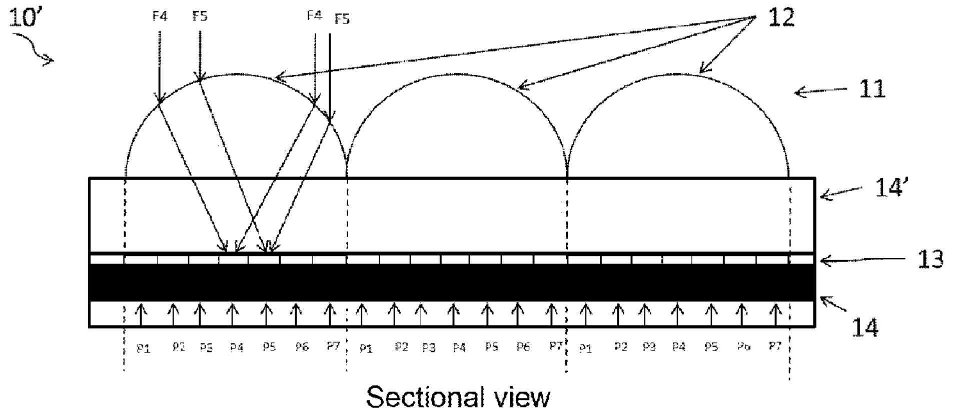
Sectional view

[FIG. 6]
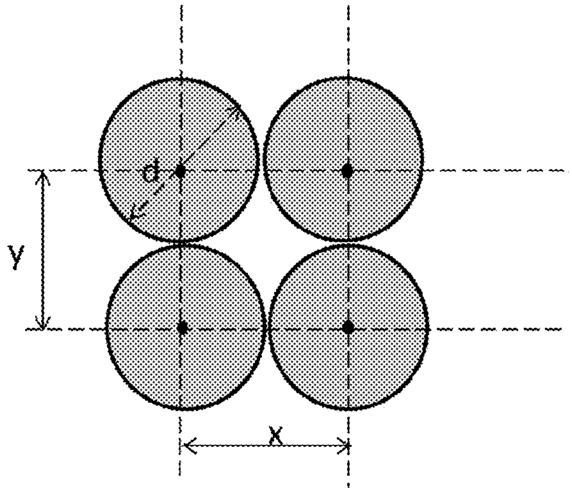
[Fig. 7]
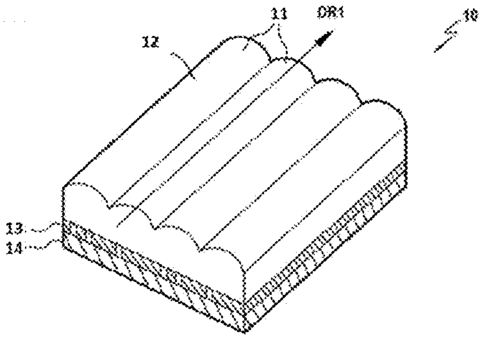
[Fig. 8]
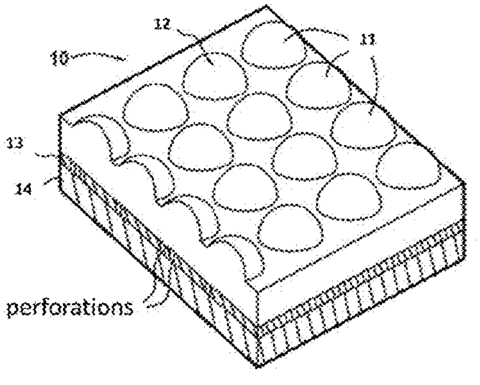

[Fig. 9]
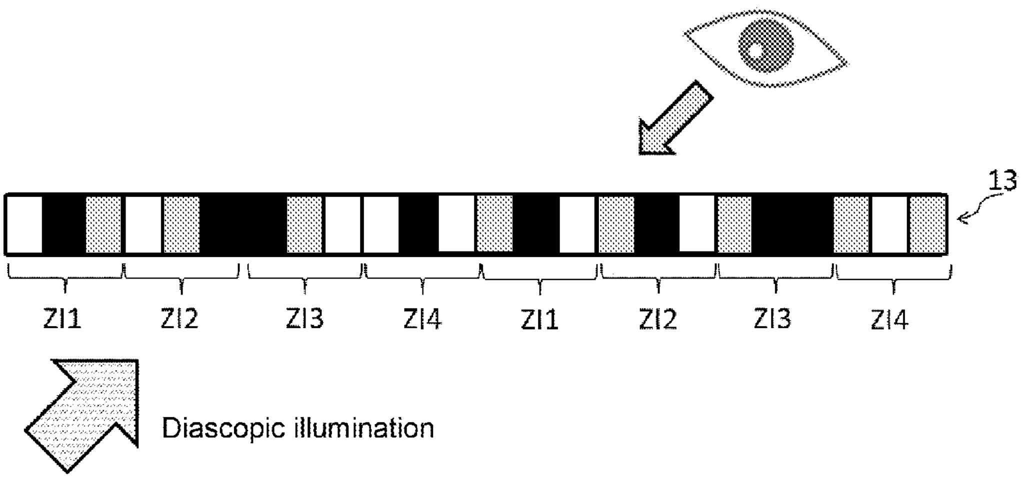
[Fig. 10]
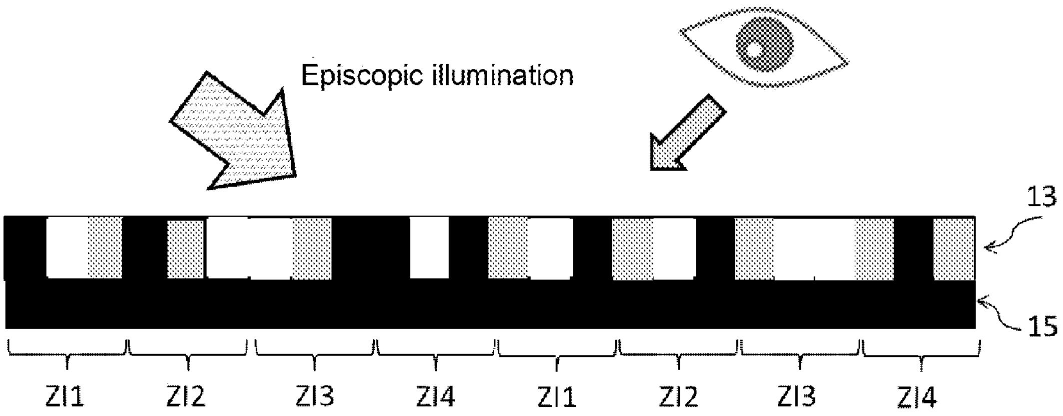

[Fig. 11]
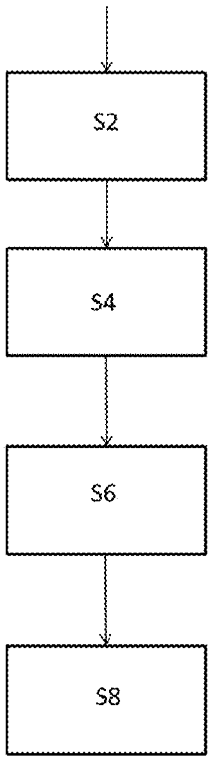
[Fig. 12]
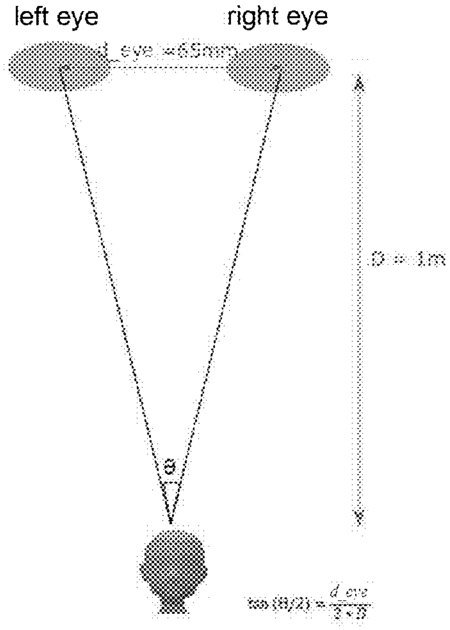

SECURE DOCUMENT AND METHOD FOR MANUFACTURING A SECURE DOCUMENT

TECHNICAL FIELD

The invention relates to a technique for forming grayscale or colour images, and relates more particularly to a document comprising a lenticular array and a laser-perforated metal layer, an image being formed from the combination of the metal layer and the laser perforations.

PRIOR ART

The invention relates to the field of security documents, and in particular to security documents on or inside which images are able to be observed.

The identity market nowadays requires identity documents (also called identification documents) to be increasingly secure. These documents must be easily authenticatable and difficult to counterfeit (if possible unforgeable). This market relates to very diverse documents, such as identity cards, passports, access badges, driving licences, etc., which may take various formats (cards, booklets, etc.).

Various types of secure documents comprising images have thus been developed over time, especially with a view to securely identifying people. Passports, identity cards and various other official documents nowadays generally comprise security elements that allow the document to be authenticated and the risks of fraud, falsification or counterfeiting to be limited. Electronic identity documents comprising a chip card, such as electronic passports for example, have thus seen a substantial increase in popularity over the last few years.

In the identity sector, microlenses are often used to secure documents and simplify authentication thereof. By virtue of the magnification of the lenses, multiple images interleaved on one and the same area are able to be observed one by one or in pairs for a pair of stereoscopic images, depending on the adopted viewing angle. This technique may be used either to create multi-image animations or for three-dimensional (3D) effects.

However, when laser-engraving these images using a sensitive structure with a thickness of a few tens of microns, such as polycarbonate, it is necessary to carry out laser shooting at angles that are relatively far apart in order to minimize overlap of the areas engraved in the thickness and to provide good separation of the images. This limits the quantity of images able to be interleaved. If just to have correct animation finesse, that is to say good motion fluidity, a larger number of images would be desirable. The prior art therefore requires accepting a compromise on quality, given the excessively limited quantity of images able to be engraved under the lens. FIG. 1 illustrates the use of polycarbonate in prior-art techniques. To this end, FIG. 1 shows a section through a secure document comprising at least three layers. A first transparent layer, the purpose of which is primarily to stiffen the security document. A second layer that is similar or different, for example in terms of thickness, not shown, may be positioned above a lenticular array comprising a plurality of cylindrical converging lenses L1, L2, L3 . . . extending parallel to a polycarbonate layer, in a direction DR1. The document also comprises a polycarbonate layer.

It is difficult at present to obtain polycarbonate layers of thickness less than a few tens of micrometres. In addition, in order to make the polycarbonate laser-sensitive, it is often necessary to add additives thereto, which accentuate the difficulty in terms of making this layer very thin. The identity document is exposed to laser beams, for example 4 laser beams F1, F2, F3 and F4. These laser beams are respectively orthogonal to the direction DR1, inclined by an angle $\theta_1$, $\theta_2$, $\theta_3$. The energy distribution of a laser is similar to a Gaussian function. Thus, for a given angle, the laser will reach high energies needed to carbonize the polycarbonate, at the focal point but also upstream and downstream of this point, depending on the thickness of the area reactive to the laser and on the power of said laser.

It is then observed that the exposure of an identity document to the beams F1, F2, F3 and F4 causes an overlap of the engraved areas, which are illustrated by the black areas in FIG. 1. This phenomenon is of course inherent to the laser beam, as mentioned above, but above all to the thickness of the polycarbonate layer, which, even reduced to a few micrometres, causes this impact width phenomenon. With the laser beam F1 thus engraving a plurality of points forming an image, the points formed by this laser in the polycarbonate layer overlap the points formed by the lasers F2, F3 and F4 corresponding to different images, and vice versa. There is therefore an overlap of areas of the images, which worsens the visual quality of the images or limits the number of engraved images enabling correct rendering for the eye. The smaller the number of images, the less fluid the motion generated by the plurality of images visualized from a different angle. It has been proposed to replace the polycarbonate layer with a metal layer so as to reduce this overlap between images. However, the existing methods do not allow high-quality visual continuity when the document is tilted because the perforations that are made are spaced apart so as to avoid delamination problems, which occur when the perforations are not spaced apart sufficiently.

There is therefore a need to rectify the problems and deficiencies indicated above. The present invention aims in particular to enable the formation of personalized images that are both secure and of good quality, while at the same time avoiding the problem of image overlap as set out above and allowing good visual continuity between the images when the card is tilted.

SUMMARY OF THE INVENTION

To this end, the present invention relates to a secure document comprising:

- a metal layer or metal oxide layer,
- a lenticular array comprising converging lenses positioned facing the metal layer or metal oxide layer,
- at least one transparent layer on which the metal layer or metal oxide layer is arranged such that said metal layer or metal oxide layer is interposed between the lenticular array and the transparent layer;
- wherein the metal layer or metal oxide layer comprises perforations formed by focusing a plurality of laser radiations through the lenticular array onto the metal layer or metal oxide layer, the plurality of laser radiations being directed at a plurality n of angles of incidence in order to form said perforations so as to reveal n personalized images when the secure document is observed at the n angles of incidence,
- said perforations being produced in contiguous or overlapping perforation areas so as to form visual continuity between the n personalized images when said document is tilted.

The presence of the contiguous perforation areas advantageously makes it possible to obtain an image density that makes it possible to obtain visual continuity, that is to say scrolling of images giving the impression of fluid motion, when the card is tilted, and to obtain a very high-quality moving image. Each perforation area may advantageously comprise a perforation the width of which may be larger or smaller depending on the power and the energy of the laser beam injected to create the perforation, and all of the perforations thus produced work together to form multiple grayscale pixels. Indeed, the perforations may reveal bright areas when the metal layer is attached to a transparent area or dark areas when the metal layer is attached to a black opaque area.

According to some embodiments, the thickness of the metal layer is between 10 and 20 nanometres.

Advantageously, it is possible to obtain metal layers of very thin thickness compared to the polycarbonate layers.

According to some embodiments, the document comprises a black opaque layer under the metal layer, said black layer not being perforated by said plurality of laser radiations.

This may make it possible to uncover dark areas under the perforations. Depending on the illumination, which is episcopic or diascopic, it is then possible to modify the visual rendering of the image.

According to some embodiments, the perforations reveal black areas when the metal layer is exposed to incident light through said lenticular array.

According to some embodiments, the perforations reveal white areas when the metal layer is exposed to incident light through the transparent layer.

This is made possible when the metal layer is placed against a transparent layer.

According to some embodiments, said metal layer or metal oxide layer comprises one or more areas comprising one or more second metal perforations to allow adhesion between said metal layer and the at least one transparent layer.

According to some embodiments, said lenses are spherical, and the maximum angle of incidence of said laser beams between the centre of one of said lenses and the radius of the lens is in a range of 14 degrees to 20 degrees, the number of perforation areas under each lens being between 5 and 7.

According to some embodiments, the distance d between the centres of two contiguous perforation areas is given by the following formula $$d = \left(\sqrt{\lambda^2 + 1}\right) * y$$

in which the pitch x of the displacement of the laser in one direction is equal to λ times the pitch y in the other direction.

The invention also relates to a method for manufacturing a secure document, comprising forming a metal layer on a support layer, positioning a lenticular layer comprising converging lenses, facing the metal layer, the metal layer being interposed between the lenticular array and the support layer; and forming perforations by focusing a plurality of laser radiations through the lenticular array onto the metal layer, the plurality of laser radiations being directed at a plurality n of angles of incidence in order to form said perforations so as to reveal n personalized images when the secure document is observed at the n angles of incidence, said perforations being produced in contiguous or overlapping perforation areas so as to form visual continuity between the n personalized images when said document is tilted.

According to some embodiments, the method comprises, prior to forming perforations and to lamination-based assembly of said layers, partially destroying the metal layer by way of laser radiation or by way of insolation so as to selectively remove at least portions of the metal underlayer so as to form demetallized areas in the metal layer.

According to some embodiments, said plurality of laser radiations passes through said metal layer in a first direction and in a second direction perpendicular to the first, the pitch x of the displacement of the laser in one direction being equal to λ times the pitch y in the other direction, the minimum diameter d of a perforation for achieving ablation of the width of the pitch being determined by $$d = \left(\sqrt{\lambda^2 + 1}\right) * y$$

BRIEF DESCRIPTION OF THE DRAWINGS

Other features and advantages of the present invention will become apparent from the description given below, with reference to the appended drawings, which illustrate exemplary embodiments of the invention that are completely non-limiting in nature. In the figures:

FIG. 1 shows the use of a polycarbonate layer as known from the prior art;

FIG. 2 schematically shows a secure document according to one particular embodiment of the invention;

FIG. 3*a* shows a sectional view schematically showing a multilayer structure according to one particular embodiment of the invention, FIG. 3*b* shows a sectional view schematically showing a multilayer structure according to one particular embodiment of the invention, FIG. 4*a* shows a sectional view schematically showing a multilayer structure according to one particular embodiment of the invention, FIG. 4*b* shows a plan view schematically showing a multilayer structure according to one particular embodiment of the invention, FIG. 5*a* shows a sectional view schematically showing a multilayer structure according to one particular embodiment of the invention, FIG. 5*b* shows a plan view schematically showing a multilayer structure according to one particular embodiment of the invention, FIG. 6 shows a plan view of four perforations illustrating one example of the relationship between the diameter of a perforation and the scanning pitch of the laser radiation, FIG. 7 shows a perspective view schematically showing a multilayer structure according to one particular embodiment of the invention, FIG. 8 shows a perspective view schematically showing a multilayer structure according to one particular embodiment of the invention, FIG. 9 shows a sectional view schematically showing a multilayer structure according to one particular embodiment of the invention when the structure is illuminated with diascopic illumination, FIG. 10 shows a sectional view schematically showing a multilayer structure according to one particular embodiment of the invention when the structure is illuminated with episcopic illumination, FIG. 11 shows a method according to one particular embodiment of the invention, FIG. 12 shows one example of a representation of a face in stereoscopic vision.

DESCRIPTION OF EMBODIMENTS

As indicated above, the invention relates in general to the formation of a plurality of (colour or grayscale) images, and relates in particular to a secure document comprising a plurality of interleaved images.

In the present disclosure, the concept of grayscale refers to shades of grey that are generated in order to personalize a grayscale image. The grayscale of an area of an image defines a value between white and black. Generally, the invention may be applied both to form a grayscale image and to form a colour image. In the present disclosure, the concepts of “grayscales” and “colours” are interchangeable with each other, depending on whether it is desired to form a grayscale or colour image. The concept of the invention may thus be applied to form both colour images and grayscale images.

The invention proposes to form a plurality of personalized images in a secure manner from a metal layer and a lenticular array positioned facing the metal layer. The metal layer comprises an arrangement of diffractive nanostructures for diffracting light (at least) in the visible range. The metal layer furthermore comprises perforations (or holes) formed by focusing laser radiation through the lenticular array onto the metal layer. To this end, the lenticular array comprises converging lenses able to make the abovementioned laser radiation converge on the metal layer.

These perforations make it possible to reveal personalized—colour or grayscale—images when the document is observed at one or more appropriate observation angles. Thus, when observing the document at an angle of incidence of the laser radiation used to form perforations in the metal layer, it is possible to view an image revealed by said perforations in the metal layer.

As explained below, it is thus possible to form personalized colour or grayscale images that are of good quality (in particular with good contrast), easy to authenticate, robust with respect to risks of fraud, falsification or counterfeiting, while making it possible to considerably increase the number of images compared to the solutions from the prior art. This allows better-quality rendering, allowing real animation between the images that are obtained or high-quality three-dimensional rendering.

The invention also relates to a method for forming such a personalized image.

Other aspects and advantages of the present invention will become apparent from the exemplary embodiments described below with reference to the drawings mentioned above.

In the rest of this disclosure, exemplary implementations of the invention are described in the case of a document comprising at least two personalized images according to the principle of the invention. This document may be any document, called a secure document, such as a booklet, card or the like. The invention is particularly applicable in the formation of identity images in identity documents such as: identity cards, credit cards, passports, driving licences, secure entry badges, etc. The invention is also applicable to security documents (banknotes, notarized documents, official certificates, etc.) comprising at least one personalized image. Other implementations are however possible.

Likewise, the exemplary embodiments described below aim to form an identity image. However, it will be understood that the personalized image formed according to the concept of the invention may be arbitrary (shape, nature, colours, etc.). It may for example be an image depicting the portrait of the holder of the document in question, other implementations however being possible.

Unless otherwise indicated, elements common to a plurality of figures or analogous elements in a plurality of figures have been designated with the same reference signs and have identical or analogous characteristics, and hence these common elements have generally not been described more than once for the sake of simplicity.

As already indicated, the document within the meaning of the invention may be any document. FIG. 2 shows, according to one particular embodiment, a secure document 2 comprising a document body 4 in or on which there is formed a plurality of secure images IG according to the concept of the invention. The image IG is in fact a plurality of images at the observation angle of the secure document 2.

It is assumed in the following exemplary embodiments that the secure document 2 is an identity document, for example in the form of a card, such as an identity card, identification badge or the like. In these examples, the images IG are grayscale images, the design of which corresponds to the portrait of the holder of the document. As already indicated, other examples are however possible. According to the present disclosure, multiple images IG are produced, these being able to be visualized by varying the observation angle with respect to the secure document 2. This allows rendering that moves or three-dimensional visualization.

FIG. 3*a* shows a first embodiment of a multilayer structure 10 in an initial (blank) state, from which it is possible to form a plurality of personalized images, as shown in FIG. 2. As explained below with reference to FIG. 4*a*, this structure 10 may be personalized so as to form personalized images. This structure 10 constitutes for example the document 2 shown in FIG. 2 or may be contained within the document 2 so as to form the images IG.

As illustrated in FIG. 3*a*, the multilayer structure 10 comprises a lenticular array 12 positioned facing (above) a metal layer 13. The metal layer 13 is itself arranged on a support layer (or substrate) 14 such that this metal layer 13 is interposed between the lenticular array 12 and the support layer 14. The support layer 14 is preferably a transparent layer. Another transparent layer 14' (not shown) may be positioned above the lenticular array 12 or between the lenticular array and the metal layer.

The metal layer 13 may comprise at least one of the following materials: aluminium, silver, copper, zinc sulfide, titanium oxide, etc. This metal layer may also preferably be a metal oxide.

The lenticular array 12 comprises converging lenses (or microlenses) 11 positioned facing (above) the metal layer 13. Various arrangements and configurations of lenses 11 may be envisaged, as described below. These lenses make it possible in particular to focus laser radiation onto the metal layer 13 so as to form images IG according to the principle of the invention. According to this embodiment, the lenticular array comprises a plurality of cylindrical converging lenses 11 extending parallel to the metal layer.

As already indicated, the metal layer 13 shown in FIG. 3*a* is blank in the sense that it does not comprise the information defining the design of the final images IG that it is desired to form. In its initial state, the multilayer structure 10 does not form any personalized image IG. To form personalized images IG, perforations are formed by laser radiation in the metal layer 13, as described below.

FIG. 3*b* shows a second embodiment of a multilayer structure 10 in an initial (blank) state, from which it is possible to form a plurality of personalized images, as shown in FIG. 2. As explained below with reference to FIG. 4*a*, this structure 10 may be personalized so as to form personalized images. This structure 10 constitutes for example the document 2 shown in FIG. 2 or may be contained within the document 2 so as to form the images IG.

As illustrated in FIG. 3*b*, the multilayer structure 10 comprises a lenticular array 12 positioned facing (above) a metal layer 13. The metal layer 13 is itself arranged on a black opaque layer 15. This black opaque layer 15 does not let through light.

The black opaque layer is positioned above a support layer (or substrate) 14 such that this metal layer 13 is interposed between the lenticular array 12 and the support layer 14. The support layer 14 is preferably a transparent layer. Another transparent layer 14' (not shown) may be positioned above the lenticular array 12 or between the lenticular array and the metal layer.

The lenticular array 12 comprises converging lenses (or microlenses) 11 positioned facing (above) the metal layer 13. Various arrangements and configurations of lenses 11 may be envisaged, as described below. These lenses make it possible in particular to focus laser radiation onto the metal layer 13 so as to form images IG according to the principle of the invention. According to this embodiment, the lenticular array comprises a plurality of cylindrical converging lenses 11 extending parallel to the metal layer.

As already indicated, the metal layer 13 shown in FIG. 3*b* is blank in the sense that it does not comprise the information defining the design of the final images IG that it is desired to form. In its initial state, the multilayer structure 10 does not form any personalized image IG. To form personalized images IG, perforations are formed by laser radiation in the metal layer 13, as described below.

With reference to FIGS. 3*a* and 3*b*, it is important to note that the thickness of the metal layer 13 is of the order of a few nanometres, and preferably in a range of 10 to 40 nm.

An adhesive layer and/or a layer of glue (not shown) may be used to adhesively bond the metal layer 13 to the transparent layer 14, in the embodiments of FIGS. 3*a* and 3*b*.

As shown in FIG. 4*a*, the metal layer 13 of the multilayer structure 10 comprises perforation areas Pi formed by laser radiation Fi (by laser engraving). FIG. 4*a* illustrates an embodiment in which the lenses are cylindrical lenses. In this example, the document 10 furthermore comprises a transparent layer 14' between the metal layer 13 and the lenticular array 11. In FIG. 4*a*, 7 perforation areas are present under each lens, in the direction perpendicular to the direction of the cylindrical lens. The number of 7 lasers is given purely by way of illustration, and the present invention is applicable mainly to a multitude of laser beams that make it possible to obtain a large plurality of images.

To form these perforations, the identity document is exposed to laser beams, for example 7 laser beams $F_1$ to $F_7$. At a given angle of inclination of the laser beam, that is to say for each of the 7 laser beams, one frame per lens is engraved for each beam, each frame comprising n pixels, n being greater than or equal to 1. It is the visualization of p frames, through p lenses, that reconstitutes, for the eye of the observer, the complete image that is intended to be observed at this observation angle. The perforation areas of these n pixels are contiguous, with potentially an area of overlap. These laser beams are respectively parallel with respect to the direction normal to the direction DR1 and inclined by an angle $\theta_i$. Each of the laser beams forms a set of perforations that contribute, for each set, to forming, with the non-perforated areas, an image able to be observed in the direction of the laser beam that perforated them.

In general, it may be considered that the document 10 is exposed to i beams $F_i$, i ranging from 1 to n, the directions of which with the normal vary from 0 to $\theta n-_1$, and making it possible to observe n images when the card is tilted with visual continuity.

These perforations pass through the ultra-thin thickness of the metal layer 13 so as to reveal (or uncover), in a personalized image IG, through the metal layer 13, areas of the support layer 14 that are located facing the perforation areas Pi. Since the layer 14 is a transparent layer, the perforations have the effect of making the images brighter. It is thus possible to create grayscale shades so as to personalize a final image IG.

As illustrated in FIG. 4*a*, the perforations created by the laser beams $F_i$ make it possible to obtain an image density such that, when the user of the card tilts the card, they observe a sharp moving image and a good-quality animation, that is to say with the impression of a fluid motion in which the images do not or barely overlap, thus avoiding blurred areas as illustrated in FIG. 1. This is made possible firstly by the use of a thin metal layer perforated at various angles of inclination, allowing a high density of perforations, and secondly by the proximity of the perforations, which are contiguous. The techniques from the prior art would not have made it possible to obtain fluidity of the animation like that obtained by the present invention. Indeed, in the techniques from the prior art, in which the polycarbonate layer is perforated, it would have been necessary to

- either space the laser beams by increasing the angle of inclination between each laser beam, and thereby greatly reduce the visual continuity and therefore the quality of the obtained visual animation,
- or, by keeping deflection angles close to the laser beams, as in the present invention, to have visual continuity with a huge number of blurred areas between the images.

When observing a pair of stereoscopic images, as shown in FIG. 12, it is possible to determine that the preferred angle between two images is determined by the following formula:

$$\tan\frac{\theta}{2} = \frac{d\_eye}{2*D} \quad \text{[MATH. 2]}$$

Where d_eye, representing an average distance between the two eyes of a human being, is estimated at 65 mm and D represents the distance between the plane of the eyes and the images.

It is thus possible to determine, based on the distance at which the document is viewed, what angle between two images makes it possible to obtain a depth effect satisfactory to the human eye. Thus, if the security document is observed at a distance of 25 cm, it is deduced therefrom that the optimum angle between a pair of stereoscopic images is around 15 degrees. In order to obtain good continuity of the images, it is important to multiply the pairs of stereoscopic images under the lenses.

FIG. 4*b* illustrates a plan view of the perforations P1 to P4 created by lasers F1 to F4, respectively, as illustrated in FIG. 4*a*. The number of 4 is given solely by way of example, and could be different, for example 7 as in FIG. 4*a*. FIG. 4*b* shows for example a plan view of an area located under a single cylindrical lens. In this example, 4 distinct frames are thus engraved under a lens. Each frame comprises a plurality of pixels: the frame 1 comprises for example the pixels of the perforation areas P1. A perforation area receives only one laser shot, which produces a smaller or larger hole therein. With a frame consisting of 2 or more pixels, the laser perforates a first hole with a certain energy and at least a second hole in the perforation area contiguous with a second hole, potentially with another energy, and potentially another hole diameter.

This clearly illustrates that the 4 images formed by the perforations created by the 4 laser beams do not, or barely, overlap and allow visual continuity when the observer tilts the card to visualize the sequences of images and obtain an animation or a 3D effect. As indicated, the perforations reveal white areas due to the presence of the transparent layer under the metal layer. FIG. 4*b* therefore shows areas having perforations and areas not having perforations. It may thus be seen, according to FIG. 4*b*, that the document comprises perforation areas that are contiguous and that may be perforated by the laser. The design of the images IG is obtained by perforating certain perforation areas. The perforation areas are represented by contiguous circles, the perforation or the hole created by the laser having a diameter as defined with reference to FIG. 6.

As shown in FIG. 5*a*, the metal layer 13 of the multilayer structure 10' comprises perforation areas Pi formed by laser radiation Fi (by laser engraving). FIG. 4*a* illustrates an embodiment in which the lenses are cylindrical lenses. In this example, the document 10' furthermore comprises a transparent layer 14' between the metal layer 13 and the lenticular array 11. In FIG. 5*a*, 7 perforation areas are present under each lens, in the direction perpendicular to the direction of the cylindrical lens. The number of 7 lasers is given purely by way of illustration, and the present invention is applicable mainly to a multitude of laser beams that make it possible to obtain a large plurality of images.

To form these perforations, the identity document 10' is exposed to laser beams, for example 7 laser beams $F_1$ to $F_7$. At a given angle of inclination of the laser beam, that is to say for each of the 7 laser beams, one frame per lens is engraved for each beam, each frame comprising n pixels, n being greater than or equal to 1. It is the visualization of p frames, through p lenses, that reconstitutes, for the eye of the observer, the complete image that is intended to be observed at this observation angle. The perforation areas of these n pixels are contiguous, with potentially an area of overlap. These laser beams are respectively parallel with respect to the direction normal to the direction DR1 and inclined by an angle $\theta_i$. Each of the laser beams forms a set of perforations that contribute, for each set, to forming, with the non-perforated areas, an image able to be observed in the direction of the laser beam that perforated them.

In general, it may be considered that the document 10' is exposed to i beams $F_i$, i ranging from 1 to n, the directions of which with the normal vary from 0 to $\theta n_{-1}$, and making it possible to observe n images when the card is tilted with visual continuity.

These perforations pass through the ultra-thin thickness of the metal layer 13 so as to reveal (or uncover), in a personalized image IG, through the metal layer 13, areas of the black layer 15 that are located facing the perforations. Since the layer 15 is a black opaque layer, the perforations have the effect of making the images darker. It is thus possible to create grayscale shades so as to personalize a final image IG.

FIG. 5*b* illustrates a plan view of perforations P1 to P4 created by lasers F1 to F4, respectively, as illustrated in FIG. 5*a*. The number of 4 is given solely by way of example, and could be different, for example 7 as in FIG. 5*a*. FIG. 4*b* shows for example a plan view of an area located under a single cylindrical lens. In this example, 4 distinct frames are thus engraved under a lens. Each frame comprises a plurality of pixels: the frame 1 comprises for example the pixels of the plurality of perforation areas P1. A perforation area receives only one laser shot, which produces a smaller or larger hole therein. With a frame consisting of 2 or more pixels, the laser perforates a first hole with a certain energy and at least a second hole in the perforation area contiguous with a second hole, potentially with another energy, and potentially another hole diameter.

This clearly illustrates that the 4 images formed by the perforations created by the 4 laser beams allow visual continuity when the observer tilts the card to visualize the sequences of images and obtain an animation or a 3D effect. As indicated, the perforations reveal black areas due to the presence of the black layer under the metal layer.

It may thus be seen, according to FIGS. 4*b* and 5*b*, that the document comprises perforation areas that are contiguous and that may be perforated by the laser. The design of the images IG is obtained by perforating certain perforation areas. The perforation areas are represented by contiguous circles, the laser forming round holes in the metal layer, the spacing between the holes being defined with reference to FIG. 6, in relation to the pitch of the displacement of the laser and the inclination of the laser.

As illustrated in FIGS. 4 and 5, the perforations created by the laser beams $F_i$ thus make it possible to obtain an image density such that, when the user of the card tilts the card, they observe a sharp moving image in which the images do not overlap, thus avoiding blurred areas as illustrated in FIG. 1. This is made possible firstly by the use of a thin metal layer perforated at various angles of inclination, allowing a high density of perforations, and secondly by the proximity of the perforation areas, which are contiguous. The techniques from the prior art would not have made it possible to obtain fluidity of the animation like that obtained by the present invention. Indeed, in the techniques from the prior art, in which the polycarbonate layer is perforated, it would have been necessary to

- either space the laser beams by increasing the angle of inclination between each laser beam, and thereby greatly reduce the visual continuity and therefore the quality of the obtained visual animation,
- or, by keeping deflection angles close to the laser beams, as in the present invention, to have visual continuity with a huge number of blurred areas between the images.

As illustrated in FIGS. 4*a* and 5*a*, by tilting the document 10 or 10' in front of the eye of the user, the angle of the image 1 changes continuously to that of the image 7. The user first sees the 2 pixels of the image 1, and then 1 pixel of the image 1 and one pixel of the image 2, and then the two pixels of the image 2, and so on.

According to some embodiments, the lenses (12) are spherical, and the maximum angle of incidence (θi) of the laser beams (Fi) between the centre of one of the lenses and the radius of the lens is in a range of 14 degrees to 20 degrees, the number of perforation areas under each lens is between 5 and 7.

FIG. 6 illustrates one embodiment showing 4 perforation areas in the metal layer and illustrating the relationship between the diameter d of the perforation area and the scanning pitch of the laser beam, which is related directly to the angle of inclination. The scanning pitch x in one direction, here the horizontal direction, is equal to λ times the scanning pitch y in the other direction, the perpendicular and vertical direction. In order to obtain contiguous perforations, the diameter d must be equal to $$d = \left(\sqrt{\lambda^2 + 1}\right) * y \qquad \text{[MATH. 3]}$$

In some embodiments, an overlap of the perforation areas may be tolerated, and in this case the diameter d may be greater than this value.

Moreover, the laser radiations $F_i$ used to form the perforations (or holes) 20 to 23 in the metal layer 13 (FIGS. 4 and 5) are preferably in a wavelength spectrum different from the visible wavelength spectrum. For example, a YAG laser (for example at a wavelength of 1064 nm), a blue laser, a UV laser, etc. may be used to this end. Moreover, a pulse frequency between 1 kHz and 500 kHz may for example be applied, although other configurations are conceivable. It is up to a person skilled in the art to choose the configuration of the laser radiations $F_i$ according to the particular circumstances.

The metal layer 13 is designed such that it at least partially absorbs the energy delivered by the laser radiation $F_i$ so as to create the perforations 20 to 23 described above. In other words, the laser radiation RY is characterized by a wavelength spectrum that is at least partially absorbed by the metal layer 13. The materials of the metal layer 13 are therefore chosen accordingly.

According to one particular example, the materials forming the metal layer 13 are selected such that they do not absorb light in the visible. In this way, it is possible to create perforations 20 by way of laser radiation emitting outside the visible spectrum and to generate one or more personalized images IG that are visible to the human eye by a diffractive effect.

Moreover, as shown in FIG. 7, the converging lenses L1 to L3 may be cylindrical lenses that extend parallel in a first direction DR1. It should however be noted that other implementations are possible. FIG. 8 shows for example one variant in which the converging lenses L1 to L3 are semi-spherical, or even aspherical (thereby making it possible to compensate for optical aberrations).

FIG. 9 illustrates one exemplary embodiment of perforations in the metal layer. For the sake of clarifying the drawing, the lenticular layer and the transparent layer are not shown. Multiple perforation areas ZI1 to ZI4 are shown by way of illustration. FIG. 8 corresponds to the embodiment of FIGS. 3*a* and 4, that is to say without the presence of a black opaque layer under the metal layer. The document is illuminated from below. This illumination technique is commonly referred to as diascopic illumination by those skilled in the art. The perforations are made where it is desired to obtain an effect of brightening. The perforated areas allow light to pass through. The white areas on the metal layer 13 are thus the perforated areas. When the document 10 is illuminated in this way, white areas may be seen at the location of the perforations when said document is observed from above.

FIG. 10 illustrates one exemplary embodiment of perforations in the metal layer. For the sake of clarifying the drawing, the lenticular layer and the transparent layer are not shown. Multiple perforation areas ZI1 to ZI4 are shown by way of illustration. FIG. 9 corresponds to the embodiment of FIGS. 3*b* and 5, that is to say with the presence of a black opaque layer under the metal layer. The document is illuminated from above. This illumination technique is commonly referred to as episcopic illumination by those skilled in the art. The perforations are made where it is desired to obtain an effect of darkening. The black areas on the metal layer 13 are thus the perforated areas. When the document 10 is illuminated in this way, black areas may be seen at the location of the perforations when said document is viewed from above because the perforations reveal the black areas of the black layer at the location of the perforations.

In FIGS. 9 and 10, three pixels are present per perforation area.

FIG. 11 shows one embodiment of a method according to the invention for manufacturing a plurality of moving images on a security document as described in FIGS. 4*a* to 5*b*.

In a step S2, a metal layer 13 may be demetallized, that is to say metal areas are removed from this layer. This demetallization may preferably be carried out using an insolation method that heats the metal areas that it is desired to extract. These areas represent a very small proportion of metal. This optional step may make it possible to limit a delamination phenomenon that could occur in the step of perforating the metal layer during personalization. According to some embodiments, these areas may be 10 μm-wide strips spaced every 150 to every 200 μm.

The absence of metal in the demetallized areas of the metal layer means that there is no laser sublimation caused in these areas during the subsequent personalization of the arrangement of pixels. The demetallized areas form areas of reinforced adhesion that make it possible to avoid delaminations or losses of adhesion during personalization. During lamination, the polymer of the upper and lower transparent layers (if two layers are present, or only one layer otherwise) migrates into the demetallized areas so as to establish a polymer (polymer-to-polymer) adhesion bridge between these two layers.

In a forming step S4, a metal layer 13 is formed on a support layer 14. The metal layer 13 and the support layer 14 are as already described in the embodiments above. In particular, the metal layer 13 may comprise at least one of the following materials: aluminium, silver, copper, zinc sulfide, titanium oxide, etc. This metal layer may also preferably be a metal oxide.

The support layer 14 may be opaque with respect to at least the visible wavelength spectrum or transparent with respect to at least the visible wavelength spectrum, depending on the visual effect that it is desired to create in one or more personalized images IG. As mentioned in the above examples, according to one preferred embodiment, the layer 14 is transparent and, according to some embodiments, a black opaque layer is positioned above the metal layer before the metal layer is deposited.

An adhesive layer and/or a layer of glue (not shown) may be used to adhesively bond the metal layer 13 to the support layer 14 or, where applicable, to the opaque layer 15.

In a positioning step S6, a lenticular array 12 as already described in the embodiments above is positioned (or formed) facing the metal layer 13. In this example, the lenticular array 12 is formed directly on the metal layer 13, although other implementations are possible in which at least one intermediate layer is present between the lenticular array 12 and the metal layer 13.

As already described, the lenticular array 12 comprises converging lenses 11 positioned facing (above) the metal layer 13, the latter thus being interposed between the lenticular array 13 and the support layer 14 or the opaque layer 15.

In a forming step S8, sets of perforations (or holes) (for example the sets of perforations 20 to 23) as already described in the embodiments above are formed in the metal layer 13 by focusing a plurality of laser radiations $F_i$ through the lenticular array 12 onto the metal layer 13. These sets of perforations thus comprise a plurality of perforations produced by focusing laser radiation $F_i$ at a respective plurality of angles of incidence $\theta_i$. Some examples of values of angles used so as to obtain contiguous perforation areas have been given with reference to the figures described above. The perforations are made so as to reveal at least two corresponding interleaved personalized images when the secure document 2 (or the structure 10 or 10') is observed at the angles of incidence $\theta_i$.

Groups of perforations may thus be produced by focusing laser radiation $F_i$ through the lenticular array 12 at different angles of incidence θ. In this case, each group of perforations represents a personalized image IG able to be viewed by an observer at a corresponding observation angle $\theta_i$. The various images IG are thus formed by interleaved perforation in the metal layer 13. The perforations are contiguous or overlap to form visual continuity between the n personalized images when the document is tilted.

As described above, the perforations locally reveal dark or bright areas through the metal layer, these areas being caused (or produced) by underlying regions of the support layer 14 that are located facing the perforations or the black opaque layer located facing the perforations. To this end, the perforations here are through-perforations that extend through the thickness of the metal layer 13 so as to reveal underlying regions of the transparent support layer 14 or of the opaque layer 15.

Once step S8 is complete, this thus gives a multilayer structure 10 or 10' as described above according to various embodiments.

Those skilled in the art will understand that the embodiments and variants described above are merely non-limiting examples of implementation of the invention. In particular, those skilled in the art will be able to envision any adaptation or combination of the embodiments and variants described above, in order to meet a particular need according to the claims presented below.

The invention claimed is:

1. A secure document comprising:

a metal layer or metal oxide layer, a lenticular array comprising converging lenses positioned facing the metal layer or metal oxide layer, at least one transparent layer on which the metal layer or metal oxide layer is arranged such that said metal layer or metal oxide layer is interposed between the lenticular array and the transparent layer;

wherein the metal layer or metal oxide layer comprises perforations formed by focusing a plurality of laser radiations through the lenticular array onto the metal layer or metal oxide layer, the plurality of laser radiations being directed at a plurality n of angles of incidence in order to form said perforations so as to reveal n personalized images when the secure document is observed at the n angles of incidence, said perforations being produced in contiguous or overlapping perforation areas so as to form visual continuity between the n personalized images when said document is tilted, wherein said plurality of laser radiations passes through said metal layer and each laser is configured to form the laser radiations along a first direction and along a second direction perpendicular to the first direction, a scanning pitch x of the respective laser in one direction being equal to λ times a scanning pitch y in the other direction, the minimum diameter d of a perforation for achieving ablation of a width of the scanning pitch y, the minimum diameter d being related directly to an angle of inclination of the respective laser, being determined by $$d = \left(\sqrt{\lambda^2 + 1}\right) * y.$$

2. The document according to claim 1, wherein the thickness of the metal layer is between 10 and 20 nanometres.

3. The document according to claim 1, comprising a black opaque layer under the metal layer, said black layer not being perforated by said plurality of laser radiations.

4. The document according to claim 3, wherein the perforations reveal black areas when the metal layer is exposed to incident light through said lenticular array.

5. The document according to claim 1, wherein the perforations reveal white areas when the metal layer is exposed to incident light through the transparent layer.

6. The document according to claim 1, wherein said metal layer or metal oxide layer comprises one or more areas comprising one or more second metal perforations to allow adhesion between said metal layer and the at least one transparent layer.

7. The document according to claim 1, wherein said lenses are spherical, and the maximum angle of incidence of said laser beams between the centre of one of said lenses and the radius of the lens is in a range of 14 degrees to 20 degrees, the number of perforation areas under each lens, in the direction perpendicular to the direction of the lens, being between 5 and 7.

8. A method for manufacturing a secure document, comprising forming a metal layer on a transparent layer, positioning a lenticular layer comprising converging lenses, facing the metal layer, the metal layer being interposed between the lenticular layer and the transparent layer; and forming perforations by focusing a plurality of laser radiations through the lenticular array onto the metal layer, the plurality of laser radiations being directed at a plurality n of angles of incidence in order to form said perforations so as to reveal n personalized images when the secure document is observed at the n angles of incidence, said perforations being produced in contiguous or overlapping perforation areas so as to form visual continuity between the n personalized images when said document is tilted, wherein said plurality of laser radiations passes through said metal layer and each laser is configured to form the laser radiations along a first direction and along a second direction perpendicular to the first direction, a scanning pitch x of the respective laser in one direction being equal to λ times a scanning pitch y in the other direction, the minimum diameter d of a perforation for achieving ablation of the width of the scanning pitch y, the minimum diameter d being related directly to an angle of inclination of the respective laser, being determined by $$d=\left(\sqrt{\lambda^2+1}\right)*y.$$

9. The method according to claim 8, comprising, prior to forming perforations and to lamination-based assembly of said layers, performing laser radiation on the metal layer so as to selectively remove at least portions of the metal layer so as to form demetallized areas in the metal layer.

* * * * *